Figure 1:
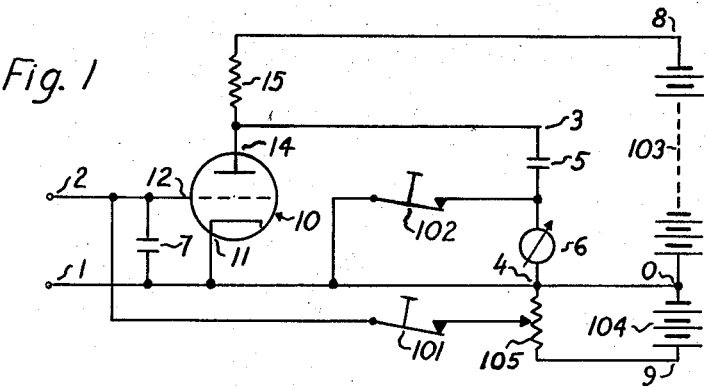

March 23, 1954

J. C. FROMMER 2,673,329

METHOD AND DEVICE TO MEASURE SMALL
ELECTRICAL DIRECT CURRENTS

Filed Aug. 3, 1950

3 Sheets-Sheet 1

INVENTOR.

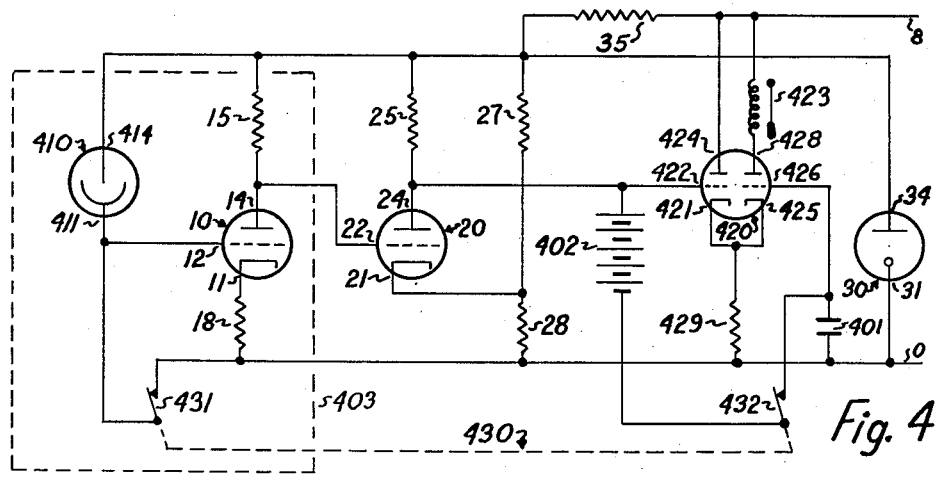
Fig. 4
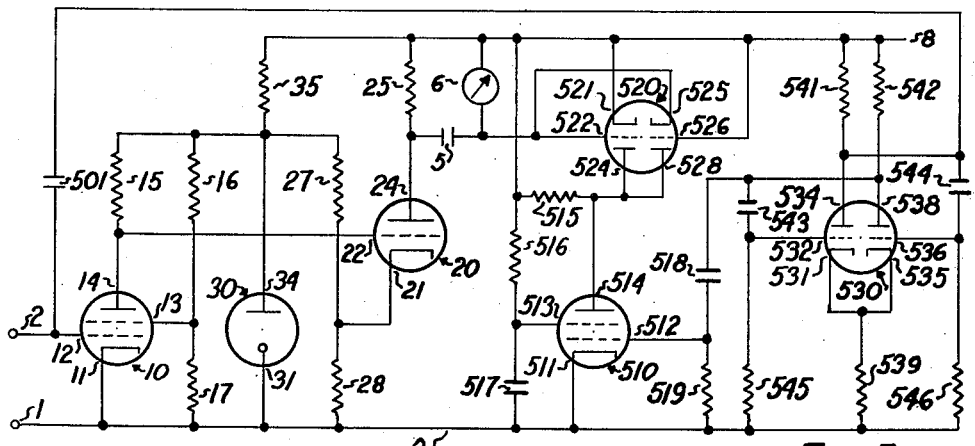
Fig. 5
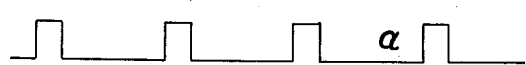
a   Fig. 6
b
c
d
Joseph C. Frommer
INVENTOR.

Patented Mar. 23, 1954

2,673,329

UNITED STATES PATENT OFFICE 2,673,329

METHOD AND DEVICE TO MEASURE SMALL ELECTRICAL DIRECT CURRENTS

Joseph C. Frommer, Cincinnati, Ohio

Application August 3, 1950, Serial No. 177,373

4 Claims. (Cl. 324—111)

At the present time the measurement of small electrical direct currents is being done by conducting these currents through a resistor of known, high ohmage and measuring the voltage drop caused by said currents across said resistors with the aid of an amplifier. The calibration of such arrangements is dependent upon the ohmage of the resistor. Further, alternating current amplification requires some sort of transformation of the very low direct current voltage into alternating current voltage, which may introduce additional errors, whilst the zero setting of direct current amplification is dependent upon the characteristic curves of the tubes being used. Drift in these data necessitates frequent recalibration and resetting of zero. The method used at present has also the following disadvantage: To measure extremely small currents, extremely high resistances have to be used. High resistance in conjunction with the inherent capacitance across the input terminals of the amplifier may have a time constant high enough to retard substantially the indication of the amplifier with respect to the current actually flowing to the input terminals. The following numerical example may illustrate this fact: Due to drift in tube characteristics, direct current input signals below about 0.1 volt cannot be measured reliably. The input capacitance of amplifiers cannot be reduced below about 1 mmfd. If $10^{-15}$ ampere is to be measured, then to obtain 0.1 volt, $10^{14}$ ohms have to be used. $10^{14}$ ohms with 1 mmfd. gives a time constant of 100 sec.

According to the present invention, it is not the voltage drop across a resistor which is being measured, but the rate at which the input capacitance of an amplifier is being charged by the currents flowing into it. If the resistor across the input terminals of the amplifier is being removed, then the $10^{-15}$ ampere will charge the input capacitance of 1 mmfd. at the rate of $10^{-3}$ volt/sec. This rate of change can be amplified by a two stage amplifier to 1 volt/sec. This rate of change of the output of the amplifier can be detected by connecting a capacitor across the output terminals and measuring the charging current flowing to this capacitor. If a capacitor of 10 mfd. is being charged at the rate of 1 volt/sec., the charging current is 10 microampere, a value which can be measured with commercially available instruments.

The change of output caused by the charging of the input capacitance would, after a certain time, bring the output tube to the limit of its useful characteristics. It is therefore necessary to reset the system from time to time. The output changes occurring during such resetting might damage the instrument across the output and therefore this instrument should be shorted out or disconnected during these periods of resetting. If only occasional indications are required, then resetting may be done manually before each indication. If continuous indication or recording is desired, then resetting should be done automatically. The operation of the device will then comprise repetitive cycles consisting of resetting periods and measuring periods. Resetting should be done preferably each time the output tube reaches one end of its useful characteristics or one end of its "stroke."

It was mentioned before that tube characteristics may drift as time passes. Such drift will not affect the amplification of the tube and therefore will not impair exact detection of the rate at which the input capacitance is being charged. It will affect however the voltage to which the input voltage has to be reset to obtain the desired state across the output at the end of the resetting period. Therefore it may be desirable to influence the resetting operation from the output in such a manner as to counteract variations in tube characteristics and cause the output to be reset always to substantially the same state.

It is an object of the present invention to provide an improved method and device to detect small direct currents.

A further object of the invention is to make detection of such currents independent from shifting of tube characteristics and from drifting of the resistance of high ohmage resistors.

A further object of the invention is to detect small direct currents by measuring the rate of change of the output of an amplifier occurring due to charging the capacitance across the input of the amplifier by said continuous currents.

A further object of the invention is to provide means to automatically reset the input of said amplifier.

A further object of the invention is to provide automatic means to reset the input voltage to a voltage which will cause the output to assume the desired point of its characteristics.

A further object of the invention is to protect the unit which detects the rate of change at the output of the amplifier during the measuring period of the cycle from surges occurring during the resetting period of the cycle.

A further object of the invention is to provide novel means for shorting out a pair of terminals as a function of electronic impulses.

Further objects and advantages of the invention will be apparent in conjunction with the detailed description in connection with the drawings of which:

Figs. 1 through 5 represent circuit diagrams of five embodiments of the invention and Fig. 6 represents time curves of voltage and current at various points of the circuit of Fig. 5.

In Fig. 1, 10 represents a vacuum tube having a cathode 11, a grid 12, and a plate 14. The filament of this vacuum tube is not represented; neither are those of the other amplifier tubes of the drawings. 103 represents a battery providing a voltage of, say, 90 volts between lines 0 and 8. 104 represents a second battery providing a voltage of, say, −6 volts between lines 0 and 9. 105 is a potentiometer connected across lines 0 and 9 so that its tap provides an adjustable bias. 7 is a capacitor of, say, 0.001 mfd.; it is connected across input terminals 1 and 2, which are connected to cathode 11 and grid 12 of tube 10 respectively. 15 is a resistor connected between plate 14 and line 8. 5 is a capacitor of, say, 10 mfd. 6 is a microammeter. Capacitor 5 is connected in series with microammeter 6 across the output terminals 3, 4, which are connected to plate 14 and cathode 11 respectively. 101 is a normally closed momentary switch, connected between grid 12 and the bias provided by potentiometer 105. 102 is another normally closed momentary switch connected across microammeter 6.

If both switches 101 and 102 are in their normal, closed position, the input voltage will equal the bias adjusted by potentiometer 105, and the output voltage across terminals 3, 4 will be a value corresponding to this input voltage. Capacitor 5 will assume a charge corresponding to this output voltage. If we now open the circuit which carries the small current to be measured, and insert input terminals 1, 2 between the two points at which we broke the circuit, then the small current will find its way through switch 101 and through part of the potentiometer 105 without affecting the output across 3, 4. If, however, we open switch 101, this path is interrupted, and the current flowing to and from terminals 1 and 2 will find no other path than to charge up capacitor 7. Accordingly, the voltage across the input of the amplifier will change, and it will cause a corresponding change across the output of the amplifier. The change in output voltage will cause a charging current to flow to capacitor 5. If now, switch 102 is also opened, the charging current to 5 will have to flow through microammeter 6. This charging current, being an indication of the variation per unit of time of the output voltage, is also an indication of the variation per unit of time of the input voltage, which, in turn, is an indication of the small current flowing into capacitor 7, which was to be detected.

If the useful range of plate voltages of tube 10 lies between, say, 40 and 80 volts (i. e. if tube 10 can be operated with a sufficient bias to prevent grid current down to 40 volts at the plate, and if it will still have its normal amplification if the plate current drops to the one corresponding to a voltage drop of 90−80=10 volts across resistor 15) then, the potentiometer 105 may be set to cause 60 volts at the plate if both switches 101 and 102 are closed. If now, at the opening of the switches the change of output voltage occurs at a rate of 1 volt/sec. (corresponding to, say, 10 microamperes charging current flowing to a 10 mfd. output capacitor), this change may continue for 20 seconds before the plate voltage reaches either end of its useful stroke. This time is far more than is necessary to take a reading. After a reading is taken, both switches are released, and the unit is ready for a new measurement. Switch 102 is provided to protect microammeter 6 from current pulses occurring when switch 101 is released, and it should always be closed before switch 101. The two switches can be connected mechanically so as to insure this relationship. They may be combined with a further switch which disconnects microammeter 6 from the shortcircuit provided by 102, and which connects it into the plate circuit in a way to indicate the actual plate voltage to which the unit is being set when potentiometer 104 is adjusted.

For high accuracy it is necessary to keep the grid current at the input terminals very low. For this purpose plate current and plate voltage of the input tube must be kept low. On the other hand, it is desirable to have a high plate current at the output of the amplifier (to reduce the error in amplification caused by the charging current flowing into the output capacitor) and to allow the output voltage to vary over a considerable range (to have an ample output stroke). It will therefore be advantageous to use a tube operating at low plate voltage and low plate current at the input, and another tube operating at high plate current and high plate voltage at the output.

To measure very small currents the input capacitance should be kept low. To achieve this, the Miller effect should be avoided and tubes having at least one grid between plate and control grid should be used. The embodiment represented on Fig. 2 incorporates these features together with automatic resetting of the input whenever the output reaches a certain value.

Figure 2:
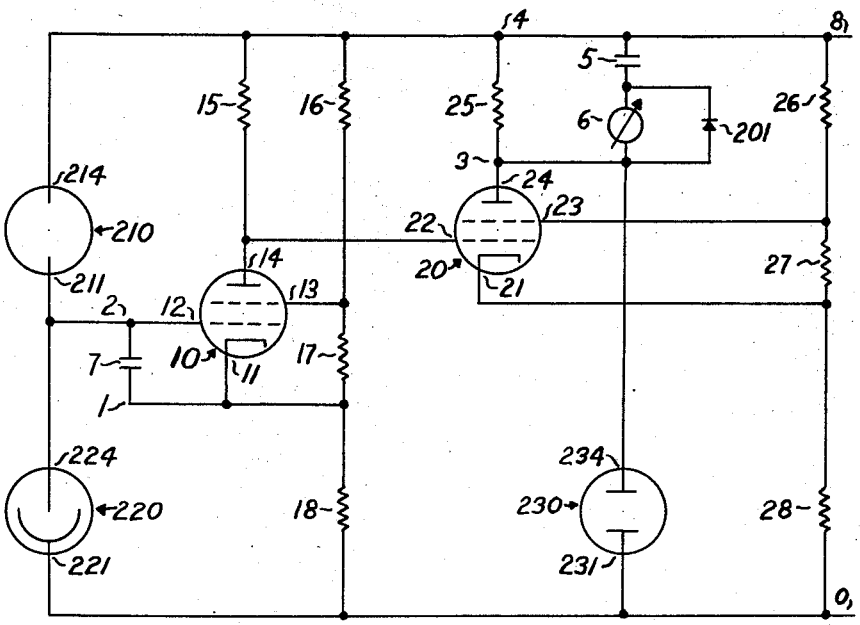

In this Fig. 2, 210 represents a circuit element, e. g. an ionization gauge the current of which is to be measured; this gauge has a cathode 211 and an anode 214; 10, 20 represent amplifier tubes having cathodes 11, 21, grids 12, 22, screen grids 13, 23 and anodes 14, 24 respectively (suppressor grids between the screen grids and plates as are usual with such amplifier tubes are not shown); 220 represents a phototube having a cathode 221 and an anode 224; 230 a glow discharge tube having a cathode 231 and an anode 234; 7 is an input capacitor, 5 an output capacitor, 6 a microammeter and 201 a rectifier, e. g. of the Germanium type. Plate voltage is supplied by a conventional power supply (not shown) providing a regulated voltage of, say, 150 volts between lines 0 and 8.

Tubes 10 and 20 are connected to form the two stages of a direct current amplifier having input terminals 1, 2 (connected to cathode 11 and grid 12 respectively) and output terminals 3, 4 (connected to plate 24 and line 8 respectively). 210 is connected in series with input terminals 1, 2, and capacitor 7 is connected across these terminals to bring the input capacitance to a calibration value of, say, 10 mmfd.

Output capacitor 5 is connected in series with galvanometer 6 across the output terminals 3, 4. Rectifier 201 is connected across galvanometer 6. Resistors 16, 17, 18 keep the cathode 11 and screen 13 of first tube 10 at, say, +3 volts and +15 volts respectively with respect to line 0. Resistors 26, 27, 28 keep cathode 21 and screen 23 of output tube 20 at, say, +20 volts and, say, +80 volts respectively, with respect to the same line 0. The glow discharge tube 230 is connected between line 0 and plate 24 of output tube 20. Phototube 220 is connected between grid 12 and line 0. It is shielded from all light except that of glow discharge tube 230.

The functioning of this circuit is the following: The current of 210 charges up capacitor 7 and causes the voltage at plate 14 to decrease. Grid 22 being connected to plate 14, the plate current of tube 20 will decrease, causing a decrease of voltage across output terminals 3, 4. Capacitor 5 will be discharged by this decrease of voltage, and its discharging current will flow through microammeter 6. This current will be an indication of the current flowing from 210 to capacitor 7. If now the voltage at plate 24 reaches a certain potential, glow discharge tube 230 ignites, and causes a photocurrent to flow through phototube 220. This will rapidly decrease the voltage at grid 12, and cause plate 24 to drop to a voltage at which glow discharge tube 230 extinguishes. Now the current of 210 will again charge capacitor 7 and the whole cycle starts anew.

During the short period of glow discharge in 230, the voltage across 3, 4 increases rapidly and would send a heavy current through 6. This current is of opposite polarity to the one flowing during the measuring period and is being shunted by rectifier 201.

Figure 3:
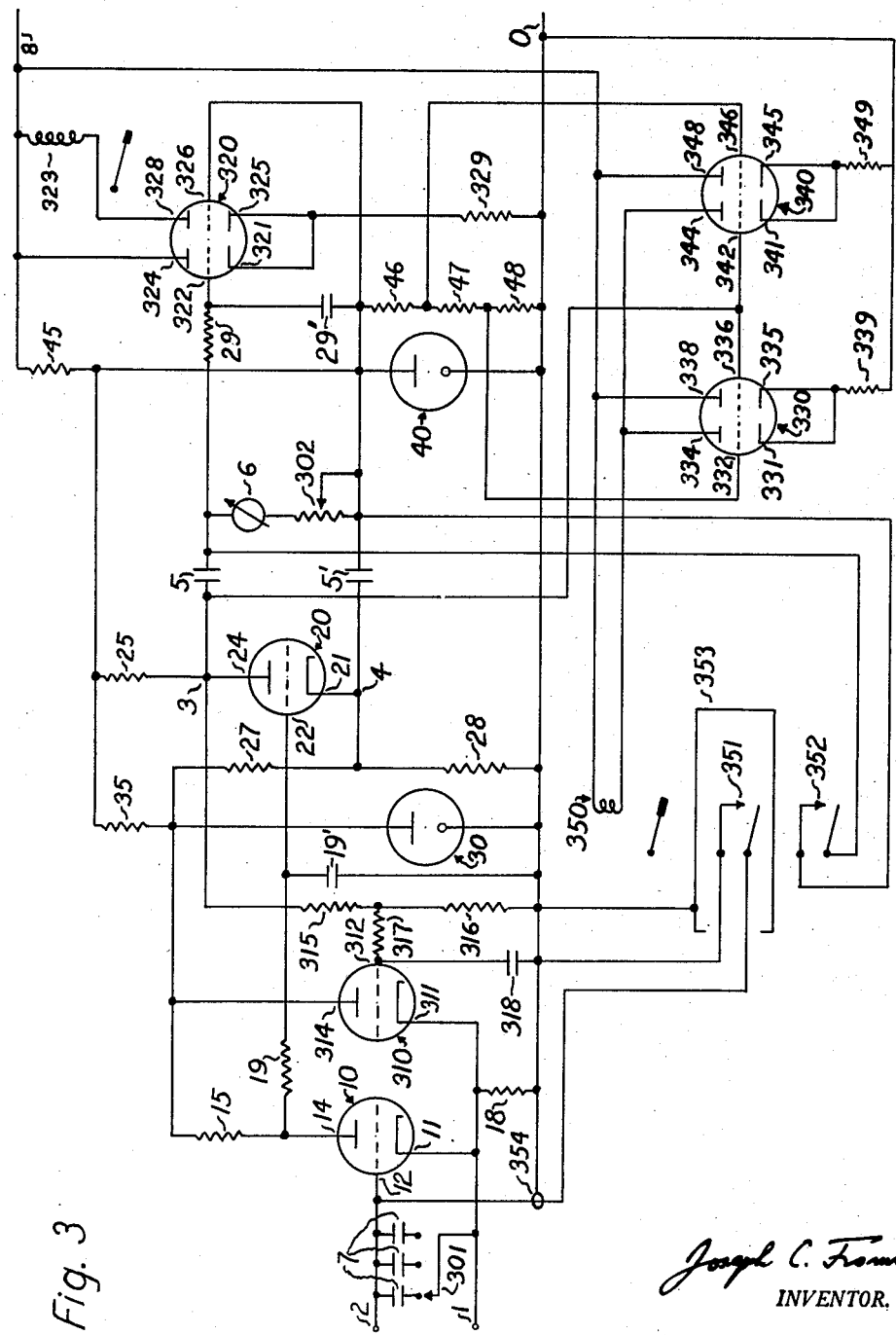

It is quite difficult to keep the dark current of phototubes low enough, and Fig. 3 represents an embodiment of the invention in which resetting is being done by a relay. This embodiment provides also a second relay which can be adjusted to give a warning signal or perform some correcting operation if the current to be detected transgresses some predetermined value.

In this figure 10, 310, 20, 320, 330 and 340 represent amplifier tubes, the former three being triodes and the latter three being twin triodes; 30 and 40 are voltage stabilizing tubes, 350 and 323 relays, and 6 is a meter. 0 and 8 represent the negative and positive terminals of a source of plate supply voltage, not shown. 1, 2 represent the input terminals and 3, 4 the output terminals of the main amplifier consisting of tubes 10, 20.

Input terminals 1, 2 are connected to cathode 11 and grid 12 of first tube 10 respectively. A selector switch 301 connects one of capacitors 7 across these input terminals so as to enable the operator to adjust the input capacitance. Cathode 11 of 10 and cathode 311 of 310 are interconnected and connected through resistor 18 to line 0. Plate 14 of tube 10 is connected across resistor 15 to a point held at a constant potential by voltage regulator tube 30. Grid 22 of tube 20 is connected to plate 14 through resistor 19, which forms a high pass filter with capacitor 19'. Cathode 21 of tube 20 is held at a potential positive with respect to line 0 by voltage divider 27, 28. Plate 24 is connected through resistor 25 to a point held at a constant potential by voltage regulating tube 40. Meter 6 is connected through variable resistor 302 and capacitors 5 and 5' to the output terminals 3, 4 of the main amplifier, which are the plate 24 and cathode 21 of tube 20.

The grid 312 of tube 310 is connected through the filter 317, 318 to the midpoint of voltage divider 315, 316, which in turn is connected between plate 24 of tube 20 and line 0.

Cathodes 321 and 325 of twin triode 320 are interconnected, and connected through resistor 329 to line 0. Grids 322 and 326 of tube 320 are connected through the filter network 29, 29' across the series connection of resistor 302 and meter 6. Plate 324 of tube 320 is connected directly, and plate 328 of tube 320 is connected through the coil of relay 323 to line 8. The two cathodes 331, 335 of twin triode 330 are interconnected, and connected through resistor 339 to line 0. The two cathodes 341 and 345 of tube 340 are interconnected, and connected through resistor 349 to line 0. Grid 336 of tube 330 and grid 342 of tube 340 are connected to plate 24 of tube 20. Grid 332 of tube 330 and grid 346 of tube 340 are connected one to each tap of voltage divider 46, 47, 48, which in turn is connected across terminals of voltage regulator 40. Plate 338 of tube 330 and plate 348 of tube 340 are connected to line 8. Plate 334 of tube 330 and plate 344 of tube 340 are connected through the coil of relay 350 to line 8. The contactor 351 on this relay 350 is connected between grid 12 of tube 10 and line 0. It is surrounded by the electrostatic shield 353. The contactor 352 of relay 350 is connected across the series connection of meter 6 with resistor 302.

The current to be detected is connected across terminals 1, 2. These electrodes are usually insulated from each other, but when relay 350 is energized, its contactor 351 restores across them the voltage appearing across resistor 18. When 351 reopens, the current to be detected charges one of capacitors 7. The variation of voltage across the input causes a corresponding variation of voltage across output terminals 3, 4, and this variation of output voltage charges output capacitors 5 and 5' through adjustable resistor 302 and meter 6. The meter will thus indicate the magnitude of the current across input terminals 1, 2, and the voltage drop across resistor 302, being proportional to this current, can be used to actuate some relay 323, if this current transgresses some limit which may be set by varying the ohmage of 302. The contactors of relay 323 (not shown) may actuate any desired signal or other device.

According to the direction of the current flowing to input terminals 1, 2, the voltage on plate 24 will approach the upper or the lower limit of the useful output stroke of this tube. The voltage divider 46, 47, 48 is so designed that relay 350 is actuated by tube 330 before the low limit of output voltage stroke is reached (in the case of an input current positive with respect to input electrodes 1, 2), or by tube 340 before the upper limit of output is reached (in the case of an input current negative with respect to input electrodes 1, 2). When this relay is actuated, contactor 351 restores the input voltage, and contactor 352 shorts out the voltage surge which else would occur across meter 6 and resistor 302 during this resetting period. As soon as the input voltage causes the plate 24 to assume a voltage between the limits set by the voltage divider 46, 47, 48, the relay is being deenergized, the input capacitance is again charged up by the current to be measured and the short circuit across 6, 302 is removed.

If the resetting periods are short enough, the indication of the meter will depend entirely on the current flowing through it during the measuring periods, and relay 323 will be kept continuously open or closed according to whether this current is above or below the limit for which resistor 302 was set.

Filter 19, 19' is provided to suppress spurious interferences from 60 cycle or other sources of alternating voltages, and also to reduce danger of regeneration. Filter 29, 29' averages the voltage existing across series connection of meter 6 and resistor 302.

Tube 310 is provided to counteract shifting of the characteristics of tubes 10 and 20 and to increase the voltage drop across resistor 18, when the average voltage on anode 24 of tube 20 is higher than desired, and to decrease it if that average voltage is lower than desired.

Another embodiment of the invention is represented on Fig. 4. This circuit serves to actuate relay 423 when, after opening of switch 430, the time integral of current flowing through phototube 410 has reached a certain preset value. In this drawing 10, 20 and 420 represent amplifier tubes, 10 and 20 being triodes and 420 being a twin triode; 402 a battery and 430 a double pole normally closed switch. 403 is an electrostatic shield. 0 and 8 are the terminals of a source of direct current not shown. The anode 414 of phototube 410 is connected to plate 34 of voltage stabilizer 30, its cathode 411 is connected to grid 12 of tube 10. Cathode 11 of tube 10 is connected to line 0 through resistor 18. Plate 14 of tube 10 is connected through resistor 15 to plate 34 of voltage stabilizer 30. Cathode 21 of tube 20 is connected to the midpoint of the voltage divider 27, 28. Grid 22 of tube 20 is connected to plate 14 of tube 10. Plate 24 of tube 20 is connected through resistor 25 to the plate 34 of voltage stabilizer tube 30. Cathodes 421, 425 of twin triode 420 are connected through resistor 429 to line 0. Grid 422 of twin triode 420 is connected to plate 24 of tube 20. Grid 426 of twin triode 420 is connected through capacitor 401 to line 0 and through contactor 432 to the positive terminal of battery 402, the negative terminal of which is connected to grid 422. The coil of relay 423 is connected between plate 428 and line 8, plate 424 is connected directly to line 8. Contactor 431 is connected between line 0 and grid 12 of tube 10. Switch 430 is so constructed that both contactors 431 and 432 are normally closed. If it is actuated, both contacts are interrupted in such a way that 431 is interrupted before 432. A catch may be provided to keep it in its actuated position. As soon as contactor 431 is actuated, the current of phototube 410 starts to charge input capacitance of the amplifier, and the voltage on plate 24 will increase at a rate corresponding to the current flowing to this input capacitance. Accordingly the voltage on grid 422 will increase, whilst the voltage on grid 426 is being held by capacitor 401 at the voltage at which it was at the moment of depressing the switch, i. e. the voltage of grid 422 at that starting moment plus the voltage across the battery 402. The voltage on plate 24 reaches the value at which the relay 423 is energized after an amount of time corresponding to the rate at which the input capacitance is being charged. Relay 423 may be connected to initiate a warning signal or to stop the source of irradiation. It may also disengage the catch of switch 430. The switch 430 may be automatically operated when irradiation of the phototube is initiated.

Another embodiment of the invention which incorporates non-galvanic resetting of the input and electronic shortcircuiting of the meter is represented on Fig. 5. On this figure 10, 20, 510, 520 and 530 represent amplifier tubes, 5 a capacitor, 6 a microammeter. 0 and 8 are the terminals of a source of plate supply, not shown. 501 is a very small coupling capacitor. The current to be detected is connected across input terminals 1, 2, and its magnitude is indicated on microammeter 6. Tubes 10, 20 and 30, the connected resistors and capacitors, microammeter 6 and capacitor 5, are substantially as in the earlier figures and need no description. Tube 530 is connected as a multivibrator with a common cathode resistor 539, plate load resistors 541, 542, grid resistors 545, 546, coupling capacitors 543, 544. The respective time constants are so chosen that plate 534 is positive for a very short period and negative for the rest of the time, as indicated schematically on time curve $a$ of Fig. 6. Cathode 511 of tube 510 is connected to line 0; grid 512 of tube 510 is connected through resistor 519 to line 0, and through capacitor 518 to plate 538. Screen 513 is connected through capacitor 517 to line 0 and through resistor 516 to line 8. Plate 514 of tube 510 is connected through resistor 515 to line 8. Tube 520 is a twin triode with its grid 526 and cathode 521 connected to one side of microammeter 6; its grid 522 and cathode 525 connected to the other side of microammeter 6; and its plates 524, 528 connected to plate 514 of tube 510. Coupling capacitor 501 is connected between plate 534 of the multivibrator 530 and input terminal 2.

The functioning of this circuit is as follows: Tubes 10 and 20 send a current indicating the current flowing to input terminals 1, 2 through microammeter 6, as was described in connection with earlier figures. Resetting of the input voltage and suppression of the resetting surges, however, is performed in the following way: When anode 534 turns positive, it induces a positive surge on grid 2. When this grid reaches the grid current potential, the grid current charges this coupling capacitor so that the grid will assume a potential corresponding to low grid current almost instantaneously. When the anode 534 turns negative, it will cause grid 12 to drop by a constant amount below the point of low grid current. Thus at the start of each measuring cycle, the voltage on grid 12 will be substantially the same irrespective of the voltage of this grid at the end of the preceding measuring stroke. Suppression of the resetting pulse is accomplished in the following way: The plate current flowing in tube 510 keeps its plate 514 and consequently the plates 524 and 528 of tube 520 at a substantially negative potential with respect to line 8. These negative plates cause a space charge and prevent the flow of electrons from either cathode to the surrounding grid. However, when the plate 534 turns positive, plate 538 turns negative and cuts off the plate current of tube 510. Plate 514 and the connected plates 524, 528 become positive, and the two grid-to-cathode paths, which are connected in opposite polarity, shortcircuit meter 6 preventing the resetting surge from damaging it or from interfering with its indication.

Fig. 6 shows schematically the time curves of voltage on various points of the amplifier with respect to line 0. Curve $a$ represents the voltage on plate 534. Curve $b$ represents some arbitrary time curve of the current flowing to input terminals 1, 2: first a certain low value which increases gradually and then stays at some higher value. Curve $c$ represents the voltage on grid 12: it will vary at a steady low rate as long as the charging current is low and at a faster rate when the charging current increases. But each time the coupling capacitor 501 drives the grid into the grid current region, the grid will return almost instantaneously to the low grid current potential so that the following downward stroke will return it always to the same starting potential irrespective of the potential at the end of the previous measuring stroke. Curve d represents the current flowing through galvanometer 6. This curve d is similar to curve b, but it has dips during the resetting periods. The inertia of the meter needle will usually suppress these dips.

The above description gives only a few examples for the possible embodiments of the invention. Other combinations of the described means to amplify the variation of the input potential, of detecting the rate of variation of the output (which may be either the output current or the output voltage or some function of the two), of resetting the input voltage, of suppressing the resetting surge, of automatically readjusting the voltage to which the input is being reset as a function of the output, of actuating relays as a function of the variation of the output in combination with each other or with other known arrangements may be devised by those skilled in the art without departing from the spirit of the invention. I therefore desire that protection of my invention shall not be limited except insofar as is made necessary by the prior art and by the spirit of the appended claims.

The invention disclosed above is suitable to indicate the magnitude of small direct currents on a meter, to provide a permanent recording of the magnitude of such small direct currents by a recorder, to actuate some device if these small direct currents transgress some prescribed limit, or to control some process as a function of said small currents. To embrace all of these functions I use the expression "to detect" under which I understand determination of magnitude, indication and/or recording of this magnitude and also controlling some device as a function of this magnitude.

For the purpose of the present invention it is necessary that, during the charging period, the current to be measured has no path across the input terminals outside the possibility of charging up the input capacitance. The usual grid resistor which provides a galvanic connection between the grid and the rest of the circuit must therefore be omitted and any other galvanic connection from this grid to the rest of the amplifier has to be avoided. To express this requirement which has been pointed out in several passages of the above specification, and which, after studying this specification will be obvious to those versed in the art, I use, in the attached claims the expression "insulated terminals."

If the derivative of the output of the amplifier is to faithfully represent the current which charges the input capacitance, then it is necessary to use an amplifier in which this output is a linear function of the voltage across the input terminals for voltages changing at the rate at which the small currents to be measured charge the capacitance across said input terminals. I will refer to such amplifiers, the necessity of which will be obvious to those versed in the art and the design features of which are well known to them, as "linear amplifiers."

What I claim is:

1. A device for detecting small direct currents comprising a linear amplifier having a pair of input terminals and a pair of output terminals, said amplifier having no conductance but a certain capacitance across said input terminals, a galvanometer, an output capacitor, a first switch and a second switch, means suitable to interpose said input terminals into the circuit carrying said small direct currents, said output capacitor being connected in series with said galvanometer across said output terminals, said first switch being connected across said input terminals and said second switch being connected across said galvanometer.

2. A method of detecting small direct currents comprising the steps of charging with said small direct currents the capacitance across the insulated input terminals of an electron tube amplifier which amplifiers the voltage changes occuring across said input terminals due to the charge delivered to said input capacitance by said small direct currents so as to obtain across the output terminals of said amplifier a signal the rate of change of which is dependent on the magnitude of said small direct currents, differentiating said signal and indicating the value of the so obtained derivative.

3. A method of detecting small direct currents comprising the steps of charging with said direct currents the capacitance across the insulated input terminals of an electron tube amplifier, periodically discharging said input capacitance and creating in this way a charging period and a discharging period, amplifying in said amplifier the voltage changes occuring across said input terminals due to the charge delivered to said input capacitance by said small direct currents during said charging period so as to obtain across the output terminals of said amplifier a signal the rate of change of which is dependent on the magnitude of said small direct currents, differentiating said signal and indicating the value of the so obtained derivative.

4. A device for detecting small direct currents comprising a linear amplifier having a pair of input terminals and a pair of output terminals and having no conductance but a certain capacitance across said input terminals, means suitable to interpose said input terminals into the circuit carrying said small direct currents, automatic resetting means acting upon said input terminals to discharge said capacitance and responsive to a predetermined value of the voltage across said output terminals, a differentiating circuit across said output terminals and indicating means responsive to the derivative generated in said differentiating circuit.

JOSEPH C. FROMMER.

References Cited in the file of this patent

UNITED STATES PATENTS

| Number | Name | Date |
|---|---|---|
| 2,086,965 | Shepard | July 13, 1937 |
| 2,132,655 | Smith | Oct. 11, 1938 |
| 2,285,482 | Wunsch | June 9, 1942 |
| 2,490,579 | Clewell | Dec. 6, 1949 |
| 2,531,609 | Bulgin | Nov. 28, 1950 |
| 2,556,458 | Webster | June 13, 1951 |

FOREIGN PATENTS

| Number | Country | Date |
|---|---|---|
| 617,269 | Great Britain | Feb. 3, 1949 |